United States Patent Office 2,943,200
Patented June 28, 1960

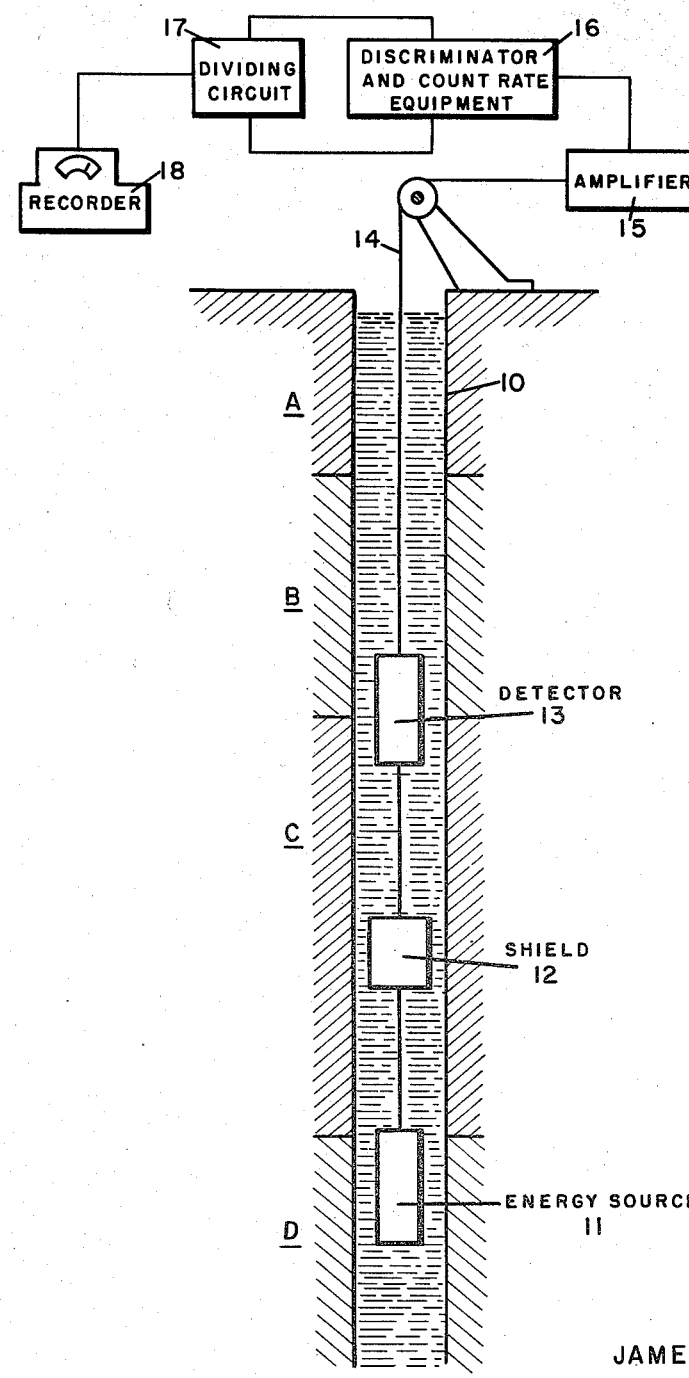

2,943,200

STABLE ISOTOPE METHOD FOR WELL LOGGING

James A. Rickard, Bellaire, Tex., assignor, by mesne assignments, to Jersey Production Research Company, Tulsa, Okla., a corporation of Delaware Filed Oct. 19, 1956, Ser. No. 617,018

19 Claims. (Cl. 250—83.3)

This invention is concerned with determining the characteristics of subsurface formations. More particularly, this invention is concerned with distinguishing subsurface formations by comparing relative amounts of stable isotopes of selected chemical elements contained in the formations.

One method of radioactive well logging, termed herein "induced nuclear reaction" logging, is to bombard a desired formation with primary radiation, normally neutrons, and observe the induced instantaneous or delayed secondary radiation, normally gamma rays. The number and energy of the induced secondary radiations are uniquely characteristic of the presence and amounts of various isotopes of the chemical elements contained in the formation. This method and desirable equipment to be employed therewith is fully described in U.S. application Serial No. 534,234, entitled "Radioactive Logging Method," filed September 14, 1955, by James A. Rickard. Thus an induced nuclear reaction log may be employed to determine the presence and amounts of carbon, for example, in subsurface formations.

This type of log, as with all known logging methods, does not log directly for a desired material such as oil or sulphur. Instead characteristics, such as the chemical nature, of the subsurface formations are determined from which the presence and amounts of any desired material are calculated. By this logging method it is possible to distinguish between different formations. For example, although carbon containing materials, such as a formation containing calcium carbonate (limestone), would indicate the presence of carbon and a sandstone saturated with oil formation also would indicate the presence of carbon, the presence of secondary radiation characteristic of calcium would indicate that the carbon radiation was derived, at least partly, from calcium carbonate. Similarly, other "chemical balance" methods may be used to indicate the nature of other types of carbon containing formations. However, the application of these methods is not accurate in all cases and when applied to certain types of formations may yield ambiguous results.

The induced nuclear reaction method does not determine the presence of a chemical element as such; instead the presence of at least one isotope of a chemical element is determined. Thus, the presence of a 4.1 mev. (million electron volts) gamma ray produced by a neutron capture reaction may indicate the presence of oxygen of mass 16 since, $$O^{16} + n \rightarrow O^{17*} \rightarrow O^{17} + \gamma (4.1 \text{ mev.})$$

If oxygen 16 were found in the formation, oxygen 17 and oxygen 18 could be assumed present also, because the three isotopes of oxygen are always present simultaneously in nature. Furthermore, the three isotopes are present in approximately the same ratio in all substances found in nature. This is true for all other stable isotopes of the various chemical elements, except those few which are the stable end products of a radioactive decay such as for example $Ca^{40}$, $A^{40}$, $Sr^{87}$, $Pb^{206}$, $Pb^{207}$, and $Pb^{208}$.

Measurements of the relative amounts of stable isotopes of the chemical elements show that even though the isotopic ratios are approximately constant in nature, small differences do exist in the isotopic ratios in different formations. For example, the ratio of carbon 12 to carbon 13 is not the same in limestone as it is in oil. These differences can be directly attributed to the natural physical, chemical and biological forces which act in nature.

Accordingly, it is possible to measure the presence and relative amounts of various stable isotopes by the induced nuclear reaction techniques and thereby determine characteristics of the formation from the isotopic ratios.

For example, if it is desired to detect the presence of hydrocarbons in a well bore, the ratio of $C^{12}$ to $C^{13}$ may be employed. In hydrocarbons this ratio is about 91.5–94 to 1, whereas in inorganically precipitated calcium carbonate (limestone) this ratio is about 88–89 to 1. The ratio difference is attributable to the action of the biological process, photosynthesis, for, since a living plant consumes $C^{12}$ more readily than $C^{13}$, living plants and their remains are relatively richer in $C^{12}$ than inorganic materials. As readily seen by measuring the ratio of $C^{12}/C^{13}$ in a number of earth formations, the carbon in hydrocarbon formations (which are remains of plants and hence organic in nature) may be distinguished from the inorganic carbon in calcium carbonate formations.

Hence, an object of this invention is to provide a method for determining the characteristics of subsurface formations by measuring the ratio of the amounts of stable isotopes of selected chemical elements present in subsurface formations.

Briefly, this invention concerns a method for determining characteristics of subsurface formations by ascertaining the ratios of the amounts of stable isotopes of selected chemical elements present in the formations comprising the steps of bombarding the subsurface formations with a source of radioactive energy, detecting the induced radiation, producing electrical pulses representative of isotopes of a selected chemical element, dividing said pulses to obtain a ratio of said isotopes and then recording said ratio.

Referring to the drawing:

The single figure is a schematic representation of suitable apparatus which may be employed in the operation of my invention.

Referring to the drawing in greater detail, in order to obtain a more complete understanding of my inventive method a borehole 10 is shown penetrating a plurality of subsurface formations, A, B, C and D. A suitable source of radioactive energy 11, a shield 12 and a suitable detector 13 are shown positioned on a cable 14, which is adapted to be lowered and raised in the borehole 10. The cable 14 is electrically conductive and connects to an amplifier 15, a discriminator and count rate equipment 16, a dividing circuit 17 and a recorder or meter 18. The shield 12 is utilized to prevent detection of primary radiation from source 11 by detector 13.

*In operation*

In accordance with the procedure described in U.S. application Serial No. 534,234, noted supra, the borehole is traversed by the source of radioactive energy 11 and detector 13, the formations are bombarded with primary energetic particles and the detector 13 detects secondary radiation particles caused by reaction with nuclei and produces an electric pulse for each secondary radiation particle detected. Detection may be made immediately after bombardment for example, any time less than one second after bombardment, to detect "instantaneous" induced radiation or detection may be made later, for example, any time longer than one second after bombardment, to detect "delayed" induced radiation. The height of the pulse is proportional to the energy of the secondary radiation particle which, in turn is representative of a particular nuclear reaction between a bombarding particle and a chemical element. The amplifier 15 amplifies each pulse and the discriminator selects pulses of a preselected amplitude and develops an output voltage which is proportional to the rate at which the preselected pulses occur.

The dividing circuit 17 divides one voltage by the other and provides an output voltage proportional to the ratio of the input voltages. This type circuit is well known and is described on pages 154-155 of Electron Tube Circuits, by Samuel Seely (McGraw-Hill, 1950). The meter or recorder 18 displays the output voltage. The amplifier, discriminator and dividing circuit are common to the art and do not form a part of the present invention.

In the $C^{12}/C^{13}$ illustration whereby the relative amounts of $C^{12}$ and $C^{13}$ in the formation are detected and recorded, a higher meter reading would indicate the presence of organic carbon, probably hydrocarbons, and a low meter reading, on the other hand, would indicate the presence of inorganic carbon. The absolute counting rate due to each isotope, as shown by the count rate equipment, would indicate the amounts of each isotope in the formations.

Typical nuclear reactions which may serve as indicators of $C^{12}$ and $C^{13}$ are:

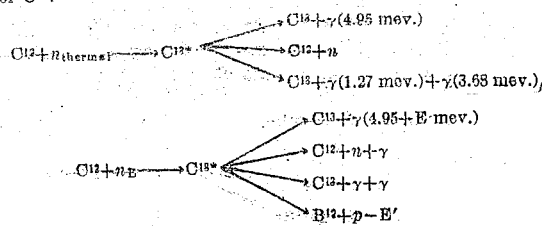

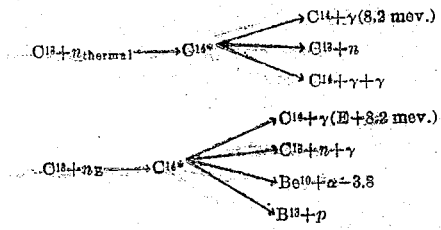

Other elements such as sulphur also have different isotopic ratios in various formations. Thus, it is possible to distinguish between native sulphur and various sulphates, such as calcium sulphate. Typical nuclear reactions which may serve as indicators of sulphur are:

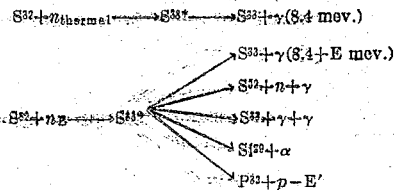

Other isotopes of sulphur have similar reactions.

The isotopes of the chemical elements have been indicated herein by the numeral affixed to the element's symbol such as $C^{12}$ or $S^{32}$. Also various reactants and reaction products have been designated herein by symbols which are conventional and well known in the art such as, $\gamma$ for gamma and $n$ for neutron. Hence, in the interest of brevity, it is considered unnecessary to further identify the terms of the reactions.

The above reactions are shown for illustrative purposes only and it is to be emphasized and understood that other reactions may be employed.

Having fully described the objects, elements and operation of my invention, I claim:

1. A method for determining characteristics of subsurface formations by ascertaining the ratio of at least two stable isotopes of each of various selected chemical elements present in said formations comprising the steps of bombarding the subsurface formations with a source of radioactive energy, detecting induced radiation and producing electrical pulses proportional to the energy and intensity of said induced radiation, selecting pulses representative of said two isotopes of each of said various selected chemical elements, dividing said pulses to thereby obtain a ratio of said two isotopes for each of said various selected chemical elements and then recording said ratio.

2. A method as recited in claim 1 wherein the isotopes of said selected chemical element are $C^{12}$ and $C^{13}$.

3. A method as recited in claim 1 wherein the isotopes of said selected chemical element are $S^{32}$ and $S^{34}$.

4. A method as recited in claim 1 wherein the induced radiation is instantaneously detected.

5. A method as recited in claim 4 wherein the isotopes of said selected chemical element are $C^{12}$ and $C^{13}$.

6. A method as recited in claim 4 wherein the isotopes of said chemical element are $S^{32}$ and $S^{34}$.

7. A method as recited in claim 1 wherein the detection of the induced radiation is delayed.

8. A method as recited in claim 7 wherein the isotopes of said selected chemical element are $C^{12}$ and $C^{13}$.

9. A method as recited in claim 7 wherein the isotopes of said selected chemical element are $S^{32}$ and $S^{34}$.

10. A method for determining characteristics of subsurface formations by ascertaining the ratio of at least two stable isotopes of each of various selected chemical elements present in said formations, comprising the steps of bombarding the subsurface formations with a source of neutrons, detecting induced gamma radiation and producing electrical pulses proportional to the energy and intensity of said induced gamma radiation, selecting pulses representative of said two isotopes of each of said various selected chemical elements and developing a voltage proportional to the number of pulses per unit of time, dividing said voltages to thereby obtain a ratio of said two isotopes for each of said various selected chemical elements and then recording said ratio.

11. A method as recited in claim 10 wherein the isotopes of said selected chemical element are $C^{12}$ and $C^{13}$.

12. A method as recited in claim 10 wherein the isotopes of said selected chemical element are $S^{32}$ and $S^{34}$.

13. A method as recited in claim 10 wherein the induced radiation is instantaneously detected.

14. A method as recited in claim 13 wherein the isotopes of said selected chemical element are $C^{12}$ and $C^{13}$.

15. A method as recited in claim 13 wherein the isotopes of said chemical element are $S^{32}$ and $S^{34}$.

16. A method as recited in claim 10 wherein the detection of the induced radiation is delayed.

17. A method as recited in claim 16 wherein the isotopes of said selected chemical element are $C^{12}$ and $C^{13}$.

18. A method as recited in claim 16 wherein the isotopes of said selected chemical element are $S^{32}$ and $S^{34}$.

19. A method as recited in claim 10 wherein the induced gamma radiation results from inelastic scattering reactions.

References Cited in the file of this patent
UNITED STATES PATENTS

| | | |
|---|---|---|
| 2,721,944 | Ruble | Oct. 25, 1955 |
| 2,752,504 | McKay | June 26, 1956 |
| 2,776,378 | Youmans | Jan. 1, 1957 |